(12) United States Patent
Kitazawa et al.

(10) Patent No.: US 6,918,286 B2
(45) Date of Patent: Jul. 19, 2005

(54) SPM CANTILEVER

(75) Inventors: Masashi Kitazawa, Ina (JP); Koichi Shiotani, Nagano-ken (JP)

(73) Assignee: Olympus Optical Co., Ltd., Tokyo (JP)

( * ) Notice: Subject to any disclaimer, the term of this patent is extended or adjusted under 35 U.S.C. 154(b) by 97 days.

(21) Appl. No.: 10/140,117

(22) Filed: May 8, 2002

(65) Prior Publication Data

US 2002/0178799 A1 Dec. 5, 2002

(30) Foreign Application Priority Data

May 31, 2001 (JP) ........................................ 2001-163781

(51) Int. Cl.[7] ............................................. G01R 33/02
(52) U.S. Cl. ...................................................... 73/105
(58) Field of Search ............................. 73/105; 250/306, 250/307; 324/762, 754, 244, 260, 261, 262

(56) References Cited

U.S. PATENT DOCUMENTS

| | | | | |
|---|---|---|---|---|
| 5,239,863 A | * | 8/1993 | Kado et al. ................... | 73/105 |
| 5,345,816 A | * | 9/1994 | Clabes et al. ................. | 438/52 |
| 6,011,261 A | * | 1/2000 | Ikeda et al. .................. | 250/306 |
| 6,121,771 A | * | 9/2000 | Moser .......................... | 324/244 |
| 6,457,350 B1 | * | 10/2002 | Mitchell ....................... | 73/105 |
| 6,528,785 B1 | * | 3/2003 | Nakayama et al. ........... | 250/306 |

FOREIGN PATENT DOCUMENTS

JP     2000-275260     10/2000

* cited by examiner

Primary Examiner—Robert Raevis
(74) Attorney, Agent, or Firm—Westerman, Hattori, Daniels & Adrian, LLP (57) ABSTRACT

A silicon nitride film is formed all over the surface of a cantilever prepared as including a support portion made by processing single-crystal silicon wafer, a lever portion extended from the support portion, formed with a controlled thickness from single-crystal silicon, and a probe portion made of single-crystal silicon disposed toward the free end of the lever portion with having its probe axis perpendicular to the lever portion, so as to have a greater film thickness on the side face of the probe portion toward the free end of the lever portion, thereby constructing SPM cantilever of configuration where the terminal end portion of the probe portion is tilted toward the free end by a certain angle θ with respect to the probe axis. The SPM cantilever thereby can be achieved as capable of measuring surface conditions always at high resolution correspondingly to measuring condition or sample shape.

27 Claims, 8 Drawing Sheets

SPM CANTILEVER

This application claims benefit of Japanese Application No. 2001-163781 filed in Japan on May 31, 2001, the contents of which are incorporated this reference.

BACKGROUND OF THE INVENTION

The present invention relates to cantilevers for use in Scanning Probe Microscopies (abbreviated as SPM).

The types of scanning probe microscopy (SPM) include scanning tunneling microscopies (STM), atomic force microscopies (AFM), etc., which are used according to a physical quantity of object to be detected. Among these, AFM is suitable to detect a configuration of sample surface at high resolution and is used for measuring the surface configuration of semiconductor, optical disc, etc.

In AFM, for example, a cantilever having a probe portion at a terminal end thereof is provided and the probe portion is placed in a manner facing a surface of sample so that the cantilever is bent in accordance with the distance between the probe portion and the sample when an atomic force acts upon the probe portion from the sample surface.

Figure 1:
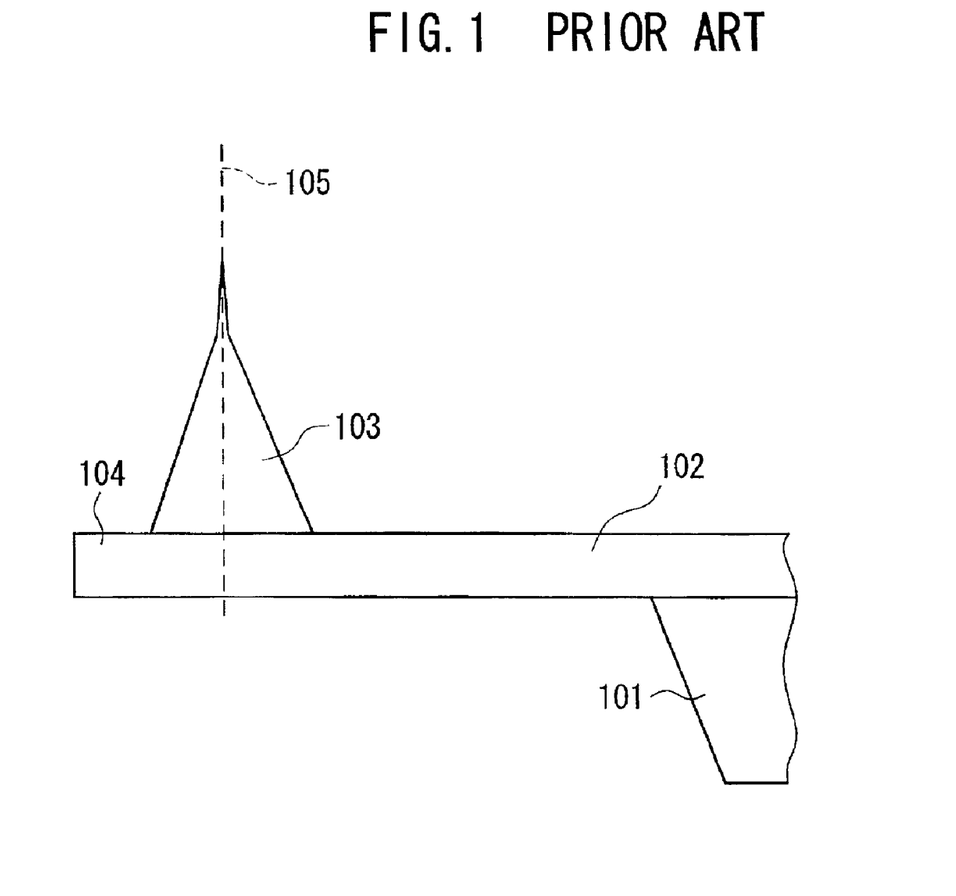
FIG. 1 is a side view showing an exemplary construction of conventional SPM cantilever.

The structure of conventional cantilever will now be described. FIG. 1 is a sectional view showing a known cantilever. Referring to FIG. 1, numeral 101 denotes a cantilever support portion made by processing a single-crystal silicon wafer and numeral 102 denotes a lever portion extended from the support portion 101. A probe portion 103 is formed toward a free end 104 of the lever portion 102. Here, the probe portion 103 is so disposed as to have its probe axis 105 perpendicular to the lever portion 102. It should be noted that, while a probe axis generally represents the axis connecting an apex of terminal end of the probe portion and a center of bottom surface of the probe portion 103 bordering the lever portion 102, it in the present invention represents a central axial straight line in the direction of length of a main body of base portion of the probe portion.

Figure 2:
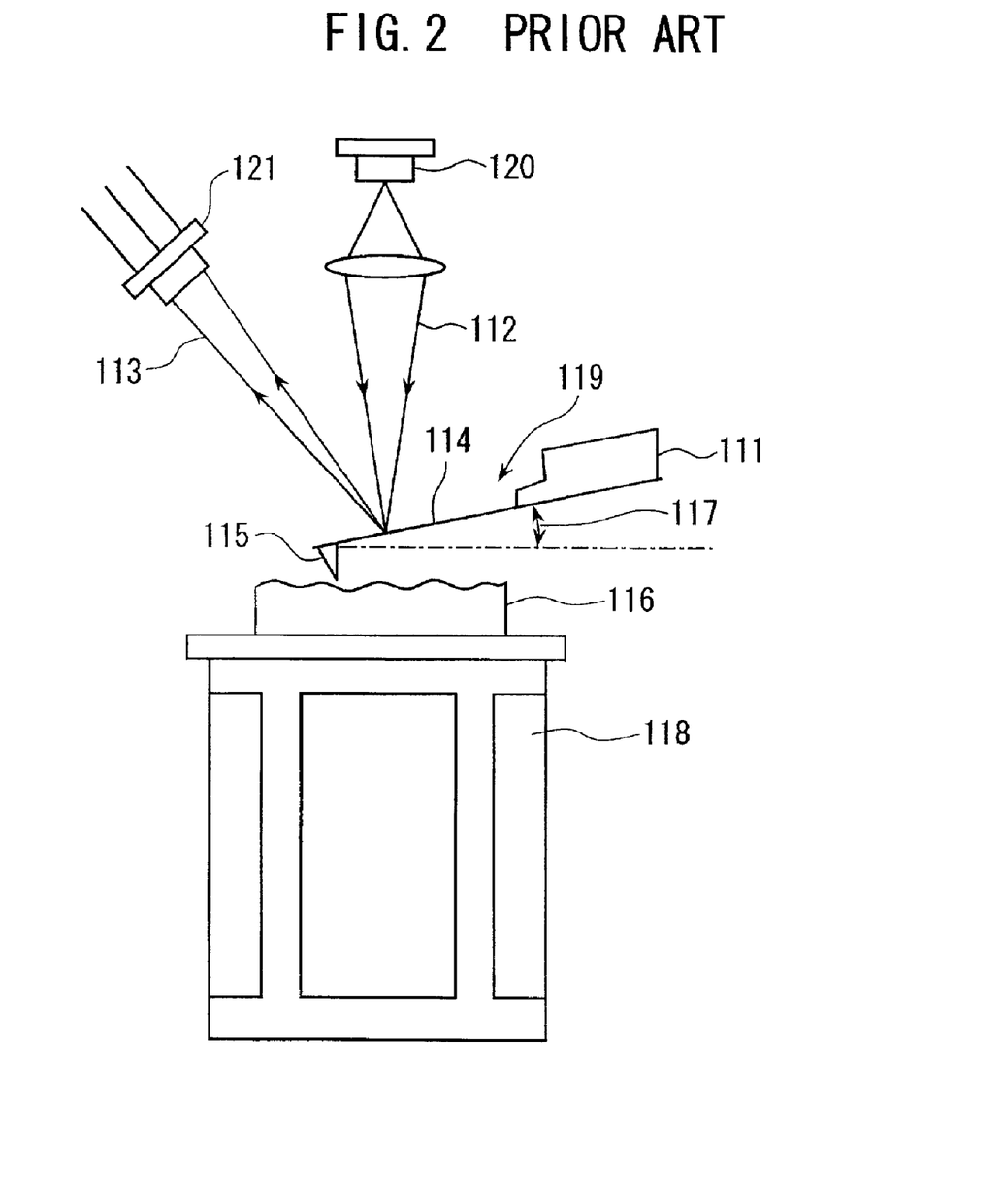
FIG. 2 shows an exemplary construction of SPM apparatus to which conventional SPM cantilever is attached.

An exemplary construction of AFM apparatus as disclosed in Japanese patent laid-open application No. 2000-275260 is shown in FIG. 2 as an example of actual measuring by attaching a cantilever of such construction to AFM apparatus. It is shown here as that using the principle of optical leverage to optically detect a displaced condition of the cantilever. In particular, a displacement measuring laser beam 112 is radiated from a light source 120 onto the back surface of a cantilever 119. A reflection laser beam 113 reflected from the back surface of the cantilever 119 is received to optically detect at a light receiving device 121 the displacement of the cantilever 119 on the basis of changes in the position at which such light is received and the amount of the received light. The cantilever 119 is attached to AFM apparatus at a support portion 111 and set with an inclination of certain angle 117 with respect to the horizontal surface of a sample 116 to be measured which is placed on a cylindrical XYZ displacement actuator 118. Accordingly, the probe portion 115, formed on the terminal end of while having the probe axis perpendicular to the lever portion 114 extended from the cantilever support portion 111, faces the horizontal surface of the sample 116 to be measured with an inclination of the certain angle 117.

Figure 3:
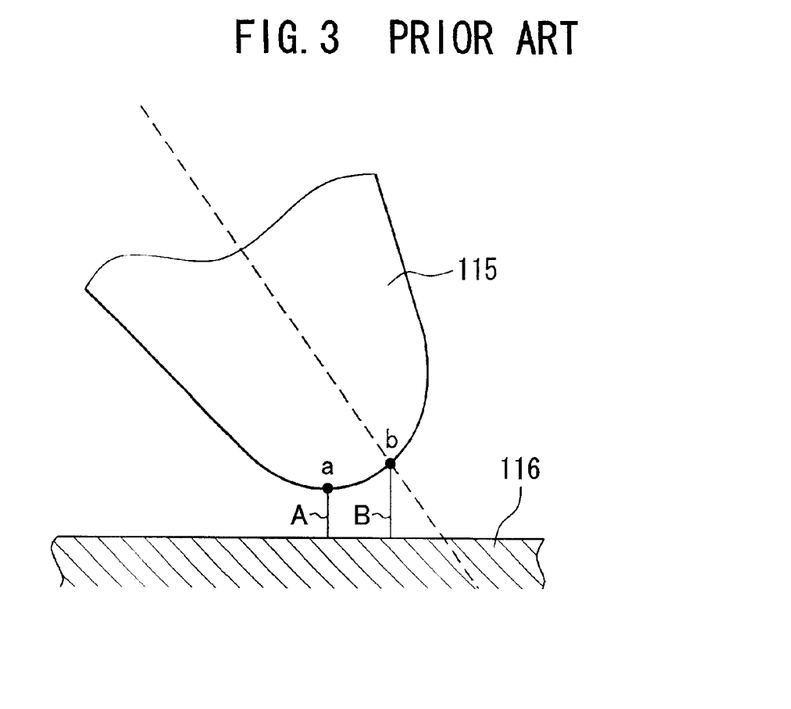
FIG. 3 is an enlarged view showing a manner of measuring by conventional SPM cantilever.

The above conventional cantilever has the problem as follows. First, as the terminal end portion of probe shown in an enlarged manner in FIG. 3, apex b of the terminal end portion of probe 115 does not necessarily come to the nearest position from the sample 116. Due to the fact that the lever portion is set with an inclination, there is a large possibility that distance B between the probe apex b and the surface of sample 116 becomes greater than distance A between point a at position shifted from the probe apex b and the surface of sample 116. As a result, the point of interaction between sample 116 and probe 115 is not determined to a certain one point. It is possibly at a position shifted from the center or the action is caused through a plurality of points. It thus becomes impossible to measure the irregularities on a sample surface accurately and at high resolution.

Further, when a convex part occurs on the sample surface in the case where the probe portion is scanned along the sample surface while it is continuously caused to oscillate at a constant amplitude in a direction perpendicular to the plane of the sample, a servo is to be actuated so as to keep the constant amplitude. However, if the probe portion is inclined in AFM measuring as described, a portion other than the apex of the terminal end of the probe portion is brought into contact with a side wall of the convex part before such an actuation of the servo. In addition to making the probe portion and sample vulnerable to damage, it becomes impossible for the terminal end portion of the probe portion to accurately take hold of the sample surface having a stepped portion for example in SPM measuring of a stepped sample surface having a steep sloping angle. An accurate SPM measuring cannot be performed.

Furthermore, in AFM measuring of the case where the angle of inclination of probe portion is to be corrected at SPM apparatus, a separate mechanism must be provided anew for example to tilt the sample stage in order to adjust the angle. A problem thus occurs that the number of parts of SPM apparatus is increased, resulting in an increased cost due to complication.

Figure 4A:
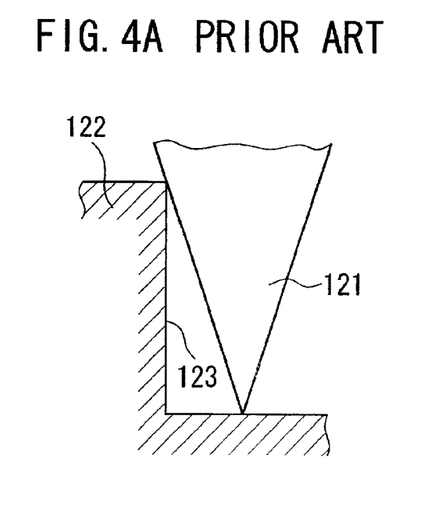
FIGS. 4A and 4B show a manner of measuring a side wall by conventional SPM cantilever.
Figure 4B:
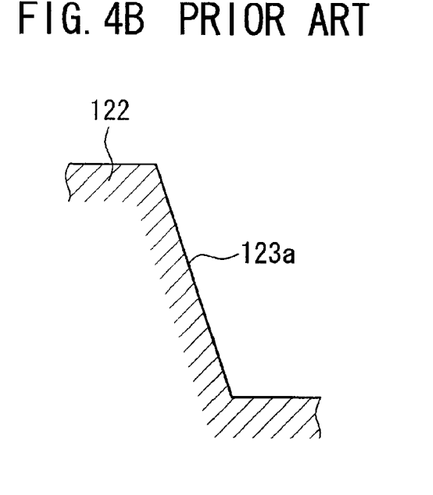

Moreover, with a cantilever having a conventional triangular pyramidal probe portion 121 as shown in FIG. 4A, measuring of the condition of a vertically raised side wall 123 of an irregular sample 122 is impossible up-to-date due to vertical angle of the probe portion 121. In other words, since the measurable side wall depends on the configuration of probe apex, only a side wall 123a of sloped surface as shown in FIG. 4B can be measured.

Further, it is difficult in forming to previously take the inclination of probe portion into consideration even in the case where the cantilever probe portion is formed from a single-crystal silicon or in the case where SiN film or the like is produced in a mold to form a probe portion by using a single-crystal silicon as the mold of the cantilever probe portion. Further, it is more difficult than the above to impart an inclination by bending the terminal end portion alone of the probe portion from the probe axis. It is difficult to be made even if the semiconductor processing technologies are applied.

While it is possible to sharpen the terminal end of cantilever probe portion by FIB (Focus Ion Beam) method, a vertical processing is a fundamental in such a case. It is very difficult to control the sharpened probe portion after the processing to a direction inclined from the probe axis by a certain angle. Further, since piece-by-piece work is performed in this technique, a reproducible probe portion is difficult to be formed.

Also in the case where CNT (Carbon Nano Tube), EBD (Electron Beam Deposition) probe is attached to the terminal end of cantilever probe portion, its attaching angle and direction to the terminal end of probe portion is difficult to be controlled. Further, since piece-by-piece work is performed also in this technique, forming of a reproducible probe portion is difficult in addition to inferior productivity.

Furthermore, since CNT is to be attached to a face at the terminal end of probe portion, it tends to be affected by roughness, angle, etc. of the face. It is thus necessary to previously form an inclined face in the original configuration of the cantilever probe portion in order that a certain angle of inclination between the probe axis and CNT is provided in the attaching. It is difficult to be controlled.

SUMMARY OF THE INVENTION

To eliminate the above problems in the conventional cantilevers, it is an object of the present invention to provide SPM cantilever which is capable of measuring at high resolution and at the same time has a well controllable terminal end of probe and can be made relatively easily.

It is another object of the invention to provide SPM cantilever in which a coating film is formed in a well controlled manner so that even those cantilevers having been constructionally not usable in the conventional SPM apparatus can be mounted on existing SPM apparatus easily and at a low cost.

These and other objects of the invention will be described below correspondingly to respective aspects of the invention. In particular, it is an object of first to third aspects of the invention to provide SPM cantilever in which a surface condition can be measured at high resolution at all times in accordance with measuring condition or sample shape.

In accordance with a first aspect of the invention, there is provided SPM cantilever including: a support portion; a lever portion extended from the support portion; and a probe portion formed in the vicinity of the free end of the lever portion, wherein a terminal end portion of the probe portion is inclined by a certain angle from the probe axis.

By such construction, SPM measuring at high resolution becomes possible at all times irrespective of sample shape or measuring condition. The above object is thereby accomplished.

In accordance with a second aspect of the invention, the terminal end portion of the probe portion of the SPM cantilever according to the first aspect is inclined by a certain angle from the probe axis so that an apex of the terminal end portion of the probe portion faces a horizontal surface of sample to be measured at a shortest distance.

By such construction, the apex of the terminal end portion of the probe portion formed on the free end of the lever portion faces always perpendicularly to the horizontal surface of the sample to be measured, making SPM measuring at high resolution possible. Accordingly, the above object is accomplished also in this way.

In accordance with a third aspect of the invention, the terminal end portion of the probe portion of the SPM cantilever according to the first aspect is inclined by a certain angle from the probe axis so that an apex of the terminal end portion of the probe portion faces a vertical surface of sample to be measured at a shortest distance.

By such construction, the apex of the terminal end portion of the probe portion formed on the free end of the lever portion faces always perpendicularly to the vertical surface of the sample to be measured, making SPM measuring at high resolution possible of a vertical face of the sample to be measured. Accordingly, a sufficient information of a sample side face to be measured especially such as of a fine, local depression on a side wall can be obtained so that measuring of a profile of the side face can be executed at high resolution. Thus the above object is accomplished also in this way.

It is an object of a fourth aspect of the invention to provide SPM cantilever of a simple construction in which the terminal end portion of the probe portion can be caused to incline by a certain angle readily in a well controllable manner.

In accordance with the fourth aspect of the invention, the probe portion of the SPM cantilever according to the first to third aspects is coated with a coating film at least at one of its faces toward the free end of the lever portion and toward the support portion.

By such construction, a film stress possessed by the coating film is used to readily tilt a very slender region of the terminal end portion of the probe portion by a certain angle by means of elasticity. Further, in respect of a very slender added terminal end probe portion having a high aspect ratio such as CNT, EBD probe formed by an adding process, a longer region can be bent in a well controllable manner as compared to a probe portion having a large vertical angle. The above object is thereby accomplished.

It is an object of a fifth aspect of the invention to provide a coating film of which film is readily formed while film thickness and stress can be readily controlled.

In accordance with the fifth aspect of the invention, the coating films in the case of applied to both of the side faces of the probe portion in the SPM cantilever according to the fourth aspect are formed of the same material.

By such construction, the coating films are readily formed and thickness and stress of the coating film become readily controllable. For this reason, it becomes easier to tilt by a certain angle from the probe axis by means of coating film so that a cantilever can be formed as having a smaller radius of curvature at probe portion terminal end. It thus becomes possible to measure fine regions at high resolution. The above object is thereby accomplished.

It is an object of a sixth aspect of the invention to provide SPM cantilever in which the terminal end portion of the probe portion can be inclined by more than 90 degrees so that a stepped side face of sample can be measured at high resolution.

In accordance with the sixth aspect of the invention, the coating films in the case of applied to both of the side faces of the probe portion in the SPM cantilever according to the fourth aspect are formed of different materials.

By such construction, coating film of materials having totally different film stress from each other can be formed so that the terminal end portion of the probe portion can be caused to incline to an angle exceeding 90 degrees from the probe axis. In the case of measuring a stepped side face of sample, apex of the probe portion can be scanned at a shortest distance from the side face, making it possible to measure information of the side face at high resolution. The above object is thereby accomplished.

It is an object of a seventh aspect of the invention to provide SPM cantilever in which a very slender region of the terminal end portion of the probe portion can be bent more readily and in a well controllable manner.

In accordance with the seventh aspect of the invention, the coating films in the case of applied to both of the side faces of the probe portion in the SPM cantilever according to fourth to sixth aspect have different film thickness.

By such construction, the terminal end portion of the probe portion at its very slender region can be readily bent from the probe axis in a well controllable manner by using elastic action of material. The above object is thereby accomplished.

It is an object of an eighth aspect of the invention to provide SPM cantilever in which a very slender region of the terminal end portion of the probe portion can be bent without causing an increase in the radius of curvature or without causing an exfoliation of the coating film.

In accordance with the eighth aspect of the invention, the coating film in the SPM cantilever according to fourth to seventh aspects is formed from one or the other of a monolayer film and a multilayer film or from a combination of monolayer film and multilayer film.

By such construction, the terminal end portion of the probe portion at a very slender region can be bent without causing an increase in the radius of curvature of the probe portion terminal end in the case of monolayer by using elastic action of material so that measuring at high resolution becomes possible. Further, in the case of a plurality of multilayer films, one of the layers can be used as a bonding layer so as not to cause a coating film to peel off from the probe portion so that SPM cantilever is obtained as having a high reliability and long life and in addition as capable of being readily bent with respect to the probe axis in a well controllable manner. The above object is thereby accomplished.

It is an object of a ninth aspect of the invention to provide SPM cantilever in which it is possible to readily tilt a very slender region of the terminal end portion of the probe portion and to which electric conductivity or magnetic property can be imparted.

In accordance with the ninth aspect of the invention, the coating film in SPM cantilever according to the fourth to eighth aspect is one of metal film, insulating film or magnetic film.

By such construction, film thickness and film stress can be readily controlled by using elastic action of material at a very slender region of the terminal end of the probe portion so that the terminal end portion of the probe portion can be readily bent from the probe axis in a well controllable manner. In addition, it becomes possible to provide electric conductivity or magnetic property by means of the coating film, making it possible to achieve SPM cantilever which can be applied to various types of measuring such as capacitance measurement of fine regions by SCM (Scanning Capacitance Microscopy), resistivity measurement by SSRM (Scanning Spreading Resistance Microscopy), and MFM (Magnetic Force Microscopy) which is capable of measuring magnetic field of material. The above object is thereby accomplished.

DESCRIPTION OF THE PREFERRED EMBODIMENTS

Figure 5A:
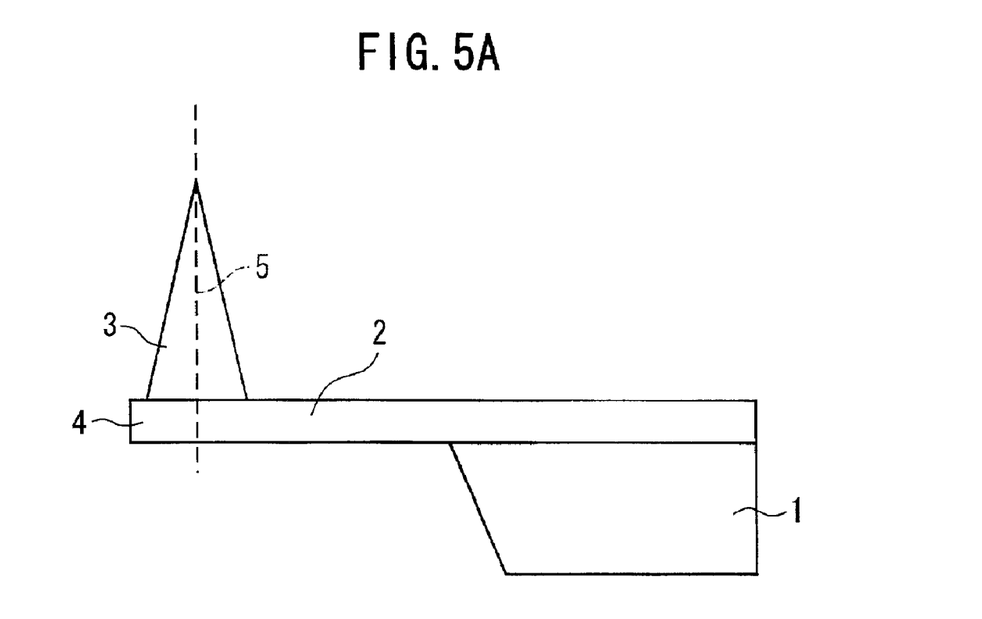
FIGS. 5A and 5B are each a side sectional view showing fabrication process for explaining a first embodiment of SPM cantilever according to the invention.
Figure 5B:
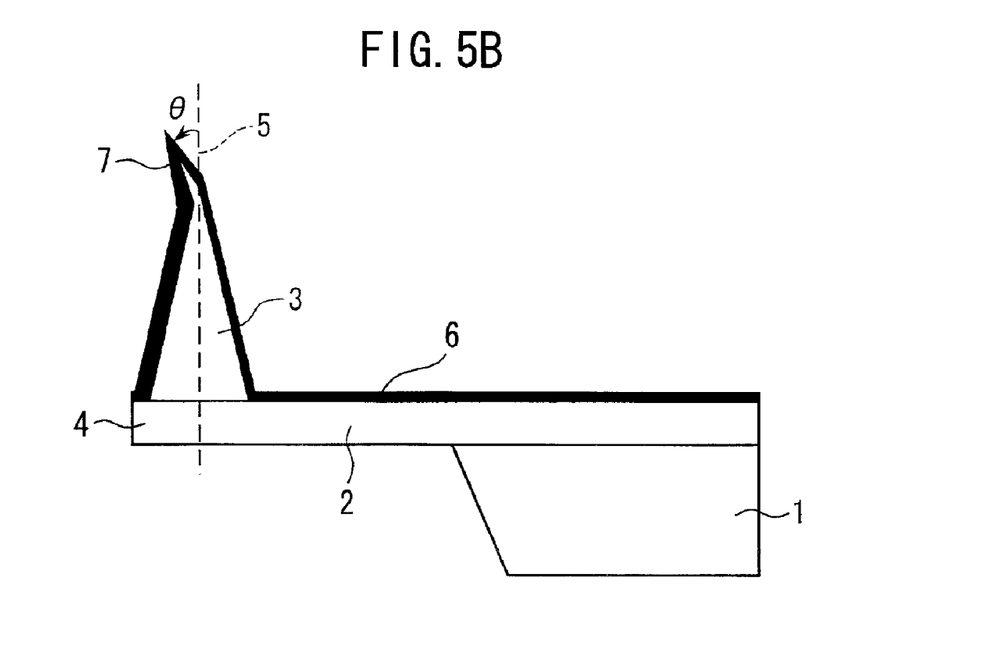

Some embodiments of the invention will now be described. A description will be first given below with respect to a first embodiment. It should be noted that, in explanation the following embodiments, construction of SPM cantilever according to each embodiment will be described while explaining its manufacturing process. FIGS. 5A and 5B are each a side sectional view showing a manner of manufacturing process of SPM cantilever according to the first embodiment of the invention. At first, an ordinary cantilever formed of a single crystal silicon material is prepared as shown in FIG. 5A. Referring to FIG. 5A: numeral 1 denotes a support portion made by processing a single-crystal silicon wafer; 2, a lever portion formed as having controlled thickness from single-crystal silicon; and 3, a sharpened conical probe portion made of single-crystal silicon extended from the support portion 1 and disposed toward a free end 4 of the lever portion 2. A probe axis 5 is disposed so as to be perpendicular to the lever portion 2. It should be noted that, while the probe portion 3 in the figure is shown as a simple circular cone, it is actually a more acutely shaped circular cone having its side faces somewhat curved toward the inside.

The cantilever having such construction is then coated with a silicon nitride film 6 having a thickness of several to several tens nanometer by means of sputtering method all over the surface of the probe portion 3 and of the face of the lever portion 2 on which the probe portion is disposed. The silicon nitride film is formed to have a greater thickness on the side face of the prove portion 3 facing the direction toward which the vicinity of the terminal end of the probe portion 3 is desired to be bent for example by using $Si_3N_4$ film which exhibits compressive stress against single-crystal silicon. Here the silicon nitride film is formed as having a greater thickness on the side face of the probe portion 3 facing the free end of the lever portion. It should be noted that, as the method for coating a thicker silicon nitride film on the desired side face, it suffices to control such conditions as direction, angle and rotating speed with respect to target when setting the cantilever within a sputtering apparatus.

By forming a coating of silicon nitride film 6 having compressive stress against single-crystal silicon with thus varying the film thickness, SPM cantilever is obtained as having construction as shown in FIG. 5B where the terminal end portion is bent toward the thicker coating of the probe portion 3, i.e., toward the free end of the lever portion so that a probe terminal end portion 7 is inclined toward the free end of the lever portion by a certain angle θ from the probe axis 5.

Here the silicon nitride film 6 is excellent in adherence to silicon material and is capable of bending the probe terminal end portion 7 by film compressive stress only of a single layer. The angle of inclination θ of the probe terminal end portion 7 is controllable on the level of ten to twenty degrees by means of film thickness of the silicon nitride film 6. While one having the probe terminal end portion 7 bent toward the free end of the lever portion 2 is shown here, it is naturally also possible to bend it toward the fixed end of the lever portion 2.

Accordingly, the terminal end portion of the probe portion of the cantilever can be bent at will by controlling the difference in film thickness of the coating film of silicon nitride film formed on the side faces of probe portion so that a reproducible measurement at an excellent resolution becomes possible irrespective of sample shape or measuring condition when SPM is used in scanning. Further, the cantilever of such construction can be achieved by a simple production method and at the same time the bending angle of the terminal end portion of the probe portion can be readily controlled by means of control of film thickness of the coating film. It should be noted that the inclination angle θ of the probe terminal end portion can be any angle as far as it is within an acceptable range in SPM measuring.

While the present embodiment has been shown as that using a silicon nitride film as the coating film, it is also possible to form the coating film by using a silicon oxide film, a silicon carbide film, or an insulating film of a silicon compound or in some cases a noncrystalline carbon film.

Figure 6:
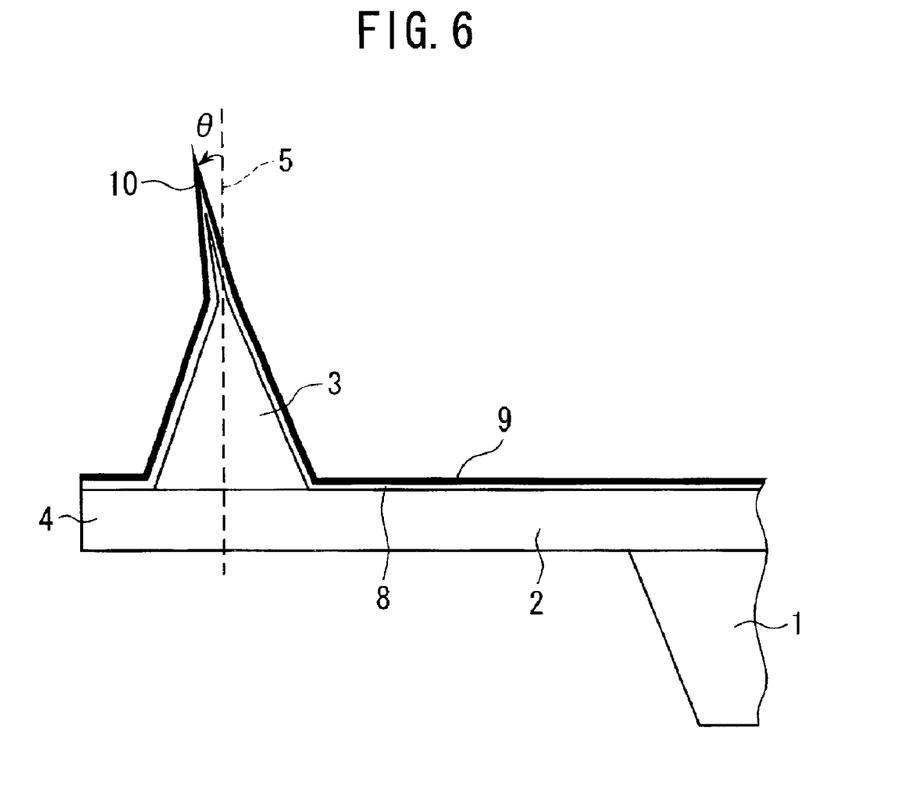
FIG. 6 is a side sectional view showing a second embodiment of the invention.

A second embodiment will now be described. This embodiment is related to SPM cantilever of construction to which an electric conductivity is imparted by applying a metal coating. FIG. 6 is a side view showing a section of SPM cantilever according to the second embodiment where like component members as in the first embodiment are denoted by like reference numerals. Referring to FIG. 6: numeral 1 denotes a support portion made by processing single-crystal silicon wafer; 2, a lever portion formed as having controlled thickness from single-crystal silicon; 3, a probe portion made of single-crystal silicon extended from the support portion 1 and disposed toward a free end 4 of the lever portion 2; 8, a metal film such as of Ti (titanium) formed all over the surface of the probe portion 3 and of the face of the lever portion 2 on which the probe portion is disposed; and 9, an electrically conductive metal coating film such as of Pt (platinum) formed as an upper layer of the metal film 8. A probe terminal end portion 10 is inclined toward the free end by a certain angle θ with respect to the probe axis 5. It should be noted that the metal film 8 is formed to have a greater thickness on the side face of the probe portion 3 toward the free end of the lever portion.

A brief description will now be given with respect to manufacturing method of SPM cantilever according to the second embodiment of such construction. First, in a similar manner as shown in FIG. 5A in relation to the first embodiment, an ordinary cantilever is made as formed from a single-crystal silicon material. A coating of the metal film 8 such as of Ti having a thickness of several to several tens nanometer is formed all over the surface of the probe portion 3 and of the face of the lever portion 2 on which the probe portion is disposed. This metal film 8 is provided to improve adhesion of the electrically conductive metal coating film to be formed as an upper layer of the metal film 8. Here Ti film having compressive stress against single-crystal silicon is used as the metal film 8 and formed so as to have a greater thickness on the side face of the prove portion 3 facing the direction toward which the vicinity of the terminal end of the probe portion 3 is desired to be bent. In this embodiment, the metal film 8 is formed as having a greater thickness on the side face of the probe portion 3 toward the free end of the lever portion. It should be noted that, as the method for forming a thicker metal film 8 on the desired side face, it suffices to control such conditions as direction, angle and rotating speed with respect to target when setting the cantilever within a sputtering apparatus.

By forming the coating of metal film such as of Ti having compressive stress against single-crystal silicon with thus varying the film thickness, SPM cantilever is obtained as having construction where the vicinity of the terminal end of probe portion 3 is bent toward the side having a greater film thickness, i.e., toward the free end of the lever portion so that the probe terminal end portion 10 is inclined toward the free end of the lever portion by a certain angle θ from the probe axis 5.

Here the angle of inclination θ of the probe terminal end portion 10 is controllable on the level of ten to twenty degrees by means of film thickness of the coating of metal film 8. While one having the probe terminal end portion 10 bent toward the free end of the lever portion is shown here, it is naturally also possible to bend it toward the fixed end of the lever portion.

Subsequently, the surface of the side on which the probe portion is disposed is coated with an electrically conductive metal coating film 9 such as of Pt (platinum) to a thickness of several tens nanometer by sputtering method similar to that of the metal coating film 8. Here control is possible by the coating of the electrically conductive metal coating film 9 either to further bend the probe terminal end portion 10 or not to bend it. Such control becomes possible by varying film stress of the electrically conductive metal coating film 9 to be formed. This film stress can be changed by such forming conditions as pressure and/or power.

By the above process, SPM cantilever having conductivity is obtained as coated with the metal film 8 which is excellent in adherence to the single-crystal silicon probe portion 3 and with the electrically conductive metal coating film 9 thereupon.

In thus constructed SPM cantilever, the terminal end portion of the probe portion of the cantilever can be bent at will by control of only the difference in film thickness of the metal film having excellent adherence to silicon or oxide film and/or of the electrically conductive metal coating film. Accordingly, when scanned by using such SPM cantilever in SPM apparatus, a reproducible measurement at an excellent resolution is possible irrespective of sample shape or measuring condition. Further, by adding conductivity to this SPM cantilever, it can be applied to various measurements such as capacitance measurement of fine regions by SCM, resistivity measurement by SSRM, etc. It should be noted that the inclination angle θ of the probe terminal end portion 10 can be any angle as far as it is within an acceptable range in SPM measuring.

While the present embodiment has been shown as that using sputtering method in coating the metal film 8, it is not limited to this and the metal film 8 can also be formed by vacuum evaporation method. Further, while the present embodiment has been shown as that using Pt for the electrically conductive metal coating film, it is not limited to Pt metal and conductivity can also be provided by forming an electrically conductive metal coating film by those metals not likely to be oxidized or an alloy thereof such as Au (gold), PtIr (platinum-iridium), etc. Furthermore, the metal film 8 serving as a lower adhesive layer of the electrically conductive metal coating film is not limited to Ti metal and can be formed also by such metals as Cr (chromium).

Moreover, it is also possible to form MFM cantilever capable of measuring magnetic field of sample by using a ferromagnetic material as Ni (nickel), nickel-iron, ferrite or Permalloy as the electrically conductive metal coating film. In such a case, since these materials are well adherent to single-crystal silicon, the coating can be formed directly on the probe portion in a similar manner as in the case of forming a coating of insulating film such as of silicon nitride film in the first embodiment.

Figure 7A:
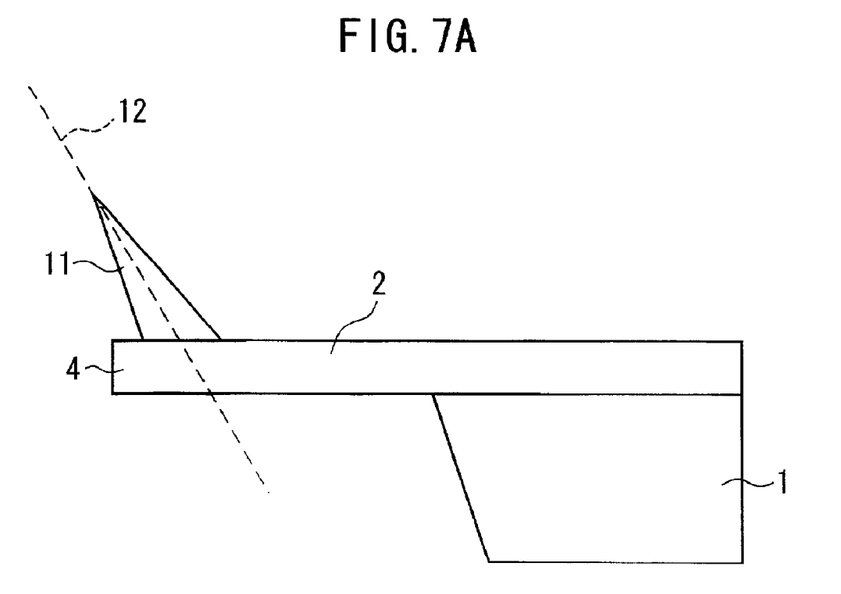
FIGS. 7A and 7B are each a side sectional view showing fabrication process for explaining a third embodiment of the invention.
Figure 7B:
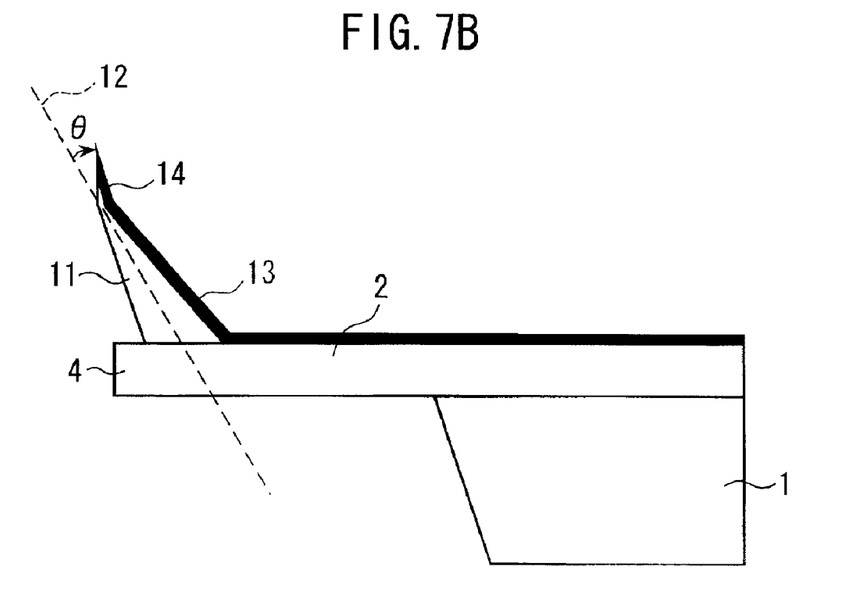

A third embodiment will now be described. The present embodiment is related to SPM cantilever of construction where the terminal end portion of the probe portion is inclined so as to be perpendicular to the lever portion. FIGS. 7A and 7B are each a sectional side view showing SPM cantilever according to the present embodiment, where like component members as in the first embodiment shown in FIGS. 5A and 5B are denoted by like reference numerals. First, as shown in FIG. 7A, a cantilever is prepared as having a support portion 1 formed by processing a single-crystal silicon wafer, a lever portion 2 extended from the support portion 1, and a probe portion 11 disposed toward a free end 4 of the lever portion 2 so as to have a probe axis 12 inclined with respect to the lever portion 2.

A coating of silicon nitride film 13 having compressive stress is then formed by means of sputtering method to a thickness of several to several tens nanometer only over the side face of the probe portion 11 facing the direction toward which the vicinity of the probe portion terminal end is desired to be bent, i.e., in this case the surface of the lever portion 2 on the side on which the probe portion 11 is disposed and of the probe side face toward the fixed end of the lever portion 2 in order to bend the vicinity of the probe portion terminal end toward the fixed end of the lever portion 2.

By thus forming a coating of silicon nitride film 13 having compressive stress over only one side face of the probe portion 11, SPM cantilever is obtained as having construction as shown in FIG. 7B where the vicinity of the terminal end of the probe portion 11 is bent toward the fixed end of the lever portion 2 so that a probe terminal end portion 14 is inclined toward the fixed end of the lever portion by a certain angle θ with respect to an original probe axis 12 of the probe portion 11, i.e., construction where the probe terminal end portion 14 is inclined so as to be perpendicular to the lever portion 2. Here the silicon nitride film 13 is excellent in adherence to silicon material and is capable of bending the vicinity of the terminal end of the probe portion 11 by film compressive stress only of a single layer. The angle of inclination θ of the probe terminal end portion 14 is controllable on the level of ten to twenty degrees by means of film thickness of the silicon nitride film 13. While one having the probe terminal end portion 14 bent toward the fixed end of lever portion 2 is shown here, it is naturally also possible to bend it further toward the free end.

In thus constructed SPM cantilever, the probe terminal end portion 14 of the cantilever can be bent at will by control only of the thickness of the coating of silicon nitride film 13 to be formed on one side face of the probe portion 11. Accordingly, when scanned by using SPM cantilever of such construction in SPM apparatus, a reproducible measurement at an excellent resolution is possible irrespective of sample shape or measuring condition. For this reason, SPM measuring at high resolution becomes possible even by those cantilevers which have been not usable due to lack of precision in measurement as incapable of scanning by setting the probe terminal end perpendicularly to the sample surface to be measured. It should be noted that the inclination angle θ of the probe terminal end portion 14 can be any angle as far as it is within an acceptable range in SPM measuring.

While the present embodiment has been shown as that using a silicon nitride film as the coating film over the probe portion, it is not limited to this and a silicon oxide film, a silicon carbide film, or an insulating film of a silicon compound or in some cases a noncrystalline carbon film can naturally also be used as the coating film.

Further, in the present embodiment, it is also possible to form a cantilever having conductivity by forming a coating of metal film of an electrically conductive material such as Ti or Pt over the single-layer of silicon nitride film 13. Alternatively, in a similar manner as in the second embodiment, a conductive cantilever can be made by coating the cantilever of single-crystal silicon with metal films to become an adhesive layer and a conductive layer without forming the coating of silicon nitride film 13.

Moreover, it is possible to form MFM cantilever by forming a coating of such ferromagnetic material as Ni (nickel), nickel-iron, ferrite or Permalloy, instead of a conductive material, over the single-layer of silicon nitride film 13 which has been formed on the side face of the probe portion.

Figure 8A:
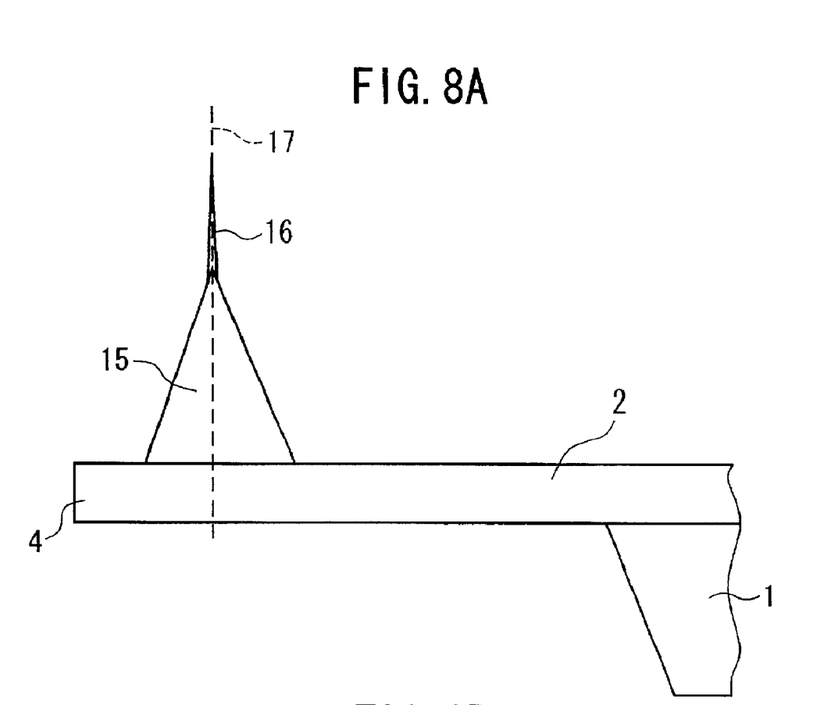
FIGS. 8A and 8B are each side sectional view showing fabrication process for explaining a fourth embodiment of the invention.
Figure 8B:
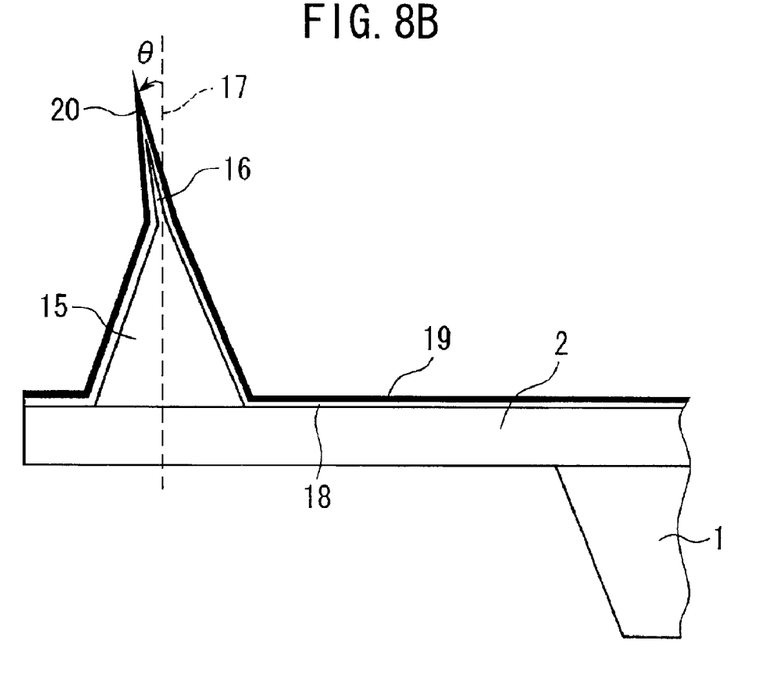

A fourth embodiment will now be described. The present embodiment is related to SPM cantilever having an added terminal end probe portion having a high aspect ratio formed by processing and adding such as CNT or EBD probe to the terminal end of probe portion. FIGS. 8A and 8B show a conductive cantilever according to the present embodiment. First, as shown in FIG. 8A, a cantilever is prepared as having a support portion 1 formed by processing a single-crystal silicon wafer, a lever portion 2 extended from the support portion 1, and a probe portion 15 provided toward a free end 4 of the lever portion 2 with a probe axis 17 perpendicular to the lever portion 2, and in addition an added terminal end probe portion 16 having a high aspect ratio region such as of CNT or EBD attached to the top of the probe portion 15.

A coating of Ti film 18 serving as an adhesive layer is then formed by means of sputtering method all over the surface of the side on which the probe portion is disposed. At this time, the coating of Ti film 18 is formed so as to have a greater thickness over the side face of probe portion 15 and added terminal end probe portion 16 facing the direction toward which the added terminal end probe portion 16 formed on the terminal end of the probe portion 15 is desired to be bent, i.e., in this case the side face toward the free end of the lever portion 2. Since Ti film 18 having compressive stress against single-crystal silicon is used, the added terminal end probe portion 16 formed on the terminal end of the probe portion as having a region of high aspect ratio as shown in FIG. 8B is bent toward the free end of the lever portion 2. Further, a coating of Pt film 19 is formed all over the side on which the probe portion is disposed to obtain SPM cantilever having conductivity. While an inclined added terminal end probe portion 20 is shown here as that formed by bending the added terminal end probe portion 16 provided at the terminal end of the probe portion toward the free end of the lever portion 2, it is naturally also possible to bend the same toward the fixed end.

By such construction, the inclined added terminal end probe portion 20 at the probe portion 15 having a very slender high aspect ratio region and the sample surface are caused to act upon each other always at a shortest distance. It is thus possible to expect an improved resolution. Further, measuring becomes possible even of the inner part of a deep groove by utilizing the slender region of the inclined added terminal end probe portion 20 of high aspect ratio. Furthermore, since the very slender region of the inclined added terminal end probe portion 20 having high aspect ratio is long, operative to elastic action and easily bendable, it can adequately deal even with measuring of a trench-like deep groove. It should be noted that the inclination angle θ of the inclined added terminal end probe portion 20 can be any angle as far as it is within an acceptable range in SPM measuring.

In the case of probe portion having an added terminal end probe portion such as of EBD or CNT, the yield has been considerably bad due to the fact that control of orientation has been difficult. According to the present embodiment, however, it is possible to confirm the orientation after adding the added terminal end probe portion and then to bend it at will within an acceptable range in SPM measuring. It is thus possible to obtain SPM cantilever which is highly productive and has a stable added terminal end probe portion.

The present embodiment has been shown as that in which the construction of the embodiment is applied to a structure where an added terminal end probe portion such as of CNT or EBD is attached to the terminal end of the probe portion perpendicular to the lever portion. It is not limited to this, however, and it can also be applied to those in which a material different from the original material of the probe portion is added and processed to the probe portion to form one having a slender shape.

Further, while sputtering method has been used in forming the coating of metal film such as Ti film to become an adhesive layer, it is not limited to this and forming by vacuum evaporation method is also possible. Further, while the present embodiment has been shown as that using Pt film for the electrically conductive metal coating film, it is not limited to Pt film and conductivity can be provided also by forming a conductive film by those metals not likely to be oxidized or an alloy thereof such as Au (gold), PtIr (platinum-iridium), etc. Furthermore, the metal film serving as an adhesive layer beneath the electrically conductive metal coating film is not limited to Ti film and can be formed also by such metals as Cr (chromium).

Moreover, it is also possible in the present embodiment to form MFM cantilever by forming a ferromagnetic material as Ni (nickel), nickel-iron, ferrite or Permalloy on the side face of the probe portion and the added terminal end probe portion. In such a case, since these materials are well adherent to single-crystal silicon, the coating film can be formed directly on the probe portion and the added terminal end probe portion in a similar manner as the insulating film such as of silicon nitride film in the first embodiment.

In addition, it is naturally also possible similarly to the first embodiment to form the coating film only of an insulating film such as silicon nitride film so as to form SPM cantilever having neither conductivity nor magnetic property.

As the above description, the first to fourth embodiments have been shown as those in which a vicinity of the terminal end of the probe portion is bent along the direction of the length of the lever portion only, i.e., either toward the free end or toward the fixed end of the lever portion. It is not limited to this, however, and it is naturally also possible that the vicinity of the terminal end of the probe portion can be bent in an arbitrary direction. Accordingly, it becomes possible to deal with a reproducible SPM measuring at high resolution without affected for example by sample shape.

Further, since a very slender region in the vicinity of the probe terminal end can be bent in an arbitrary direction, it is caused to interact always at a shortest distance and through a point with a horizontal surface of sample, a vertical surface of sample or a sloped surface of sample. An improvement in resolution can be expected and at the same time it becomes possible to measure even the inner part of a deep groove of sample so that a profile of high fidelity can be obtained.

Figure 9:
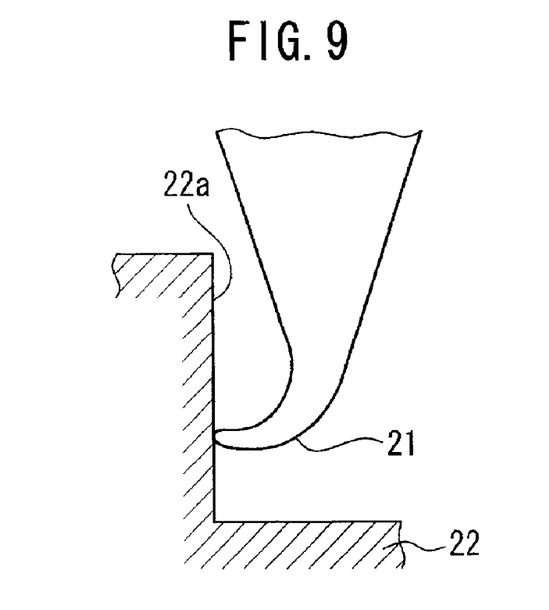
FIG. 9 shows a manner of using SPM cantilever according to the invention.

Furthermore, it becomes possible as shown in FIG. 9 to bend a very slender region 21 in the vicinity of the probe terminal end so as to vertically face a vertically raised surface 22a of sample 22 at all times. Measuring at high resolution thus becomes possible of a side wall condition of sample which has been impossible to be measured due to the effect of vertical angle of the probe terminal end.

Figure 10:
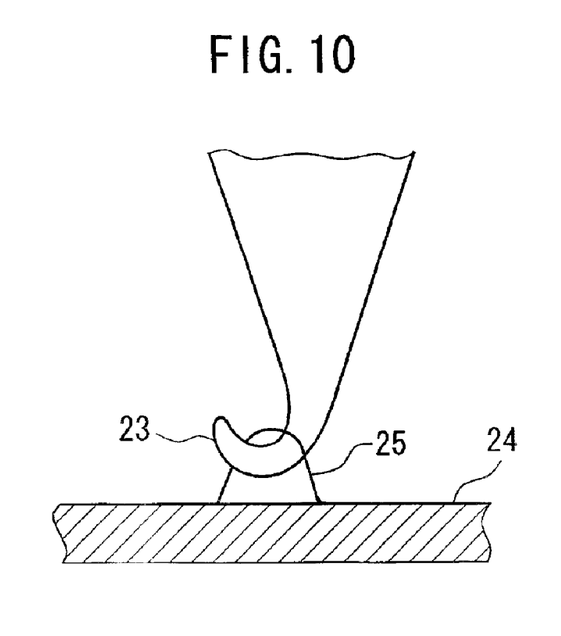
FIG. 10 shows another manner of using SPM cantilever according to the invention.

Moreover, while SPM cantilever is generally used to obtain a profile by scanning a sample surface, it is also possible by bending a probe terminal end vicinity 23 shown in FIG. 10 as has been described in the above embodiments to hook an engaging portion 25 of sample 24 to be measured in order to lift it or to move a fine sample to a different place.

As has been described by way of the above embodiments, it is possible according to the present invention to readily achieve SPM cantilever in which a very slender vicinity of the elastic terminal end of the probe portion is tilted by a predetermined angle with the bending direction controllable by the means of compressive stress of a coating film. It is thereby possible to cause an atomic force to act through a point while causing the apex of the probe portion when attached to SPM apparatus to face a sample surface to be measured always at a shortest distance. Measuring at high resolution thus become possible. Further, it is possible to reduce the types of damage which have been caused on sample by probe portion in the known SPM apparatus and to provide SPM cantilever which can be attached to existing SPM apparatus at low costs.

What is claimed is:

1. An SPM cantilever comprising:
   a support portion;
   a lever portion extended from the support portion; and
   a probe portion formed in the vicinity of a free end of the lever portion, said probe portion having;
   a main body where it touches said lever portion, and
   a terminal end portion extended from said main body, said terminal end portion ending in a tip point;
   wherein the terminal end portion of said probe portion is bent from the main body so that the terminal end portion is inclined by a certain angle from a probe axis with the tip point thereof located at a distance from the probe axis,
   wherein the probe axis is defined as a central axial straight line in the direction of length of a main body of the probe portion.

2. The SPM cantilever according to claim 1, wherein the terminal end portion of said probe portion is inclined by a certain angle from the probe axis so that an apex of the terminal end portion of said probe portion faces a horizontal surface of sample to be measured at a shortest distance.

3. The SPM cantilever according to claim 1, wherein the terminal end portion of said probe portion is inclined by a certain angle from the probe axis so that an apex of the terminal end portion of said probe portion faces a vertical surface of sample to be measured at a shortest distance.

4. The SPM cantilever according to any one of claims 1 to 3, wherein said probe portion is coated with a coating film at least at one of its faces toward the free end of said lever portion and toward said support portion.

5. The SPM cantilever according to claim 4, wherein said coating film is formed from one or the other of a monolayer film and a multilayer film or from a combination of monolayer film and multilayer film.

6. The SPM cantilever according to claim 5, wherein said coating film is one of metal film, insulating film or magnetic film.

7. The SPM cantilever according to claim 4, wherein said coating film is one of metal film, insulating film or magnetic film.

8. The SPM cantilever according to claim 4, wherein the coating films in the case of being applied to both of the side faces of said probe portion are formed of the same material.

9. The SPM cantilever according to claim 8, wherein the coating films applied to both of the side faces of said probe portion have different film thickness.

10. The SPM cantilever according to claim 9, wherein said coating films are one of metal films, insulating films or magnetic films.

11. The SPM cantilever according to claim 9, wherein said coating films are formed from one or the other of a monolayer film and a multilayer film or from a combination of monolayer film and multilayer film.

12. The SPM cantilever according to claim 11, wherein said coating films are one of metal films, insulating films or magnetic films.

13. The SPM cantilever according to claim 8, wherein said coating films are formed from one or the other of a monolayer film and a multilayer film or from a combination of monolayer film and multilayer film.

14. The SPM cantilever according to claim 13, wherein said coating films are one of metal films, insulating films or magnetic films.

15. The SPM cantilever according to claim 8, wherein said coating films are one of metal films, insulating films or magnetic films.

16. The SPM cantilever according to claim 4, wherein the coating films in the case of being applied to both of the side faces of said probe portion are formed of different materials.

17. The SPM cantilever according to claim 16, wherein the coating films applied to both of the side faces of said probe portion have different film thickness.

18. The SPM cantilever according to claim 17, wherein said coating films are formed from one or the other of a monolayer film and a multilayer film or from a combination of monolayer film and multilayer film.

19. The SPM cantilever according to claim 18, wherein said coating films are one of metal films, insulating films or magnetic films.

20. The SPM cantilever according to claim 17, wherein said coating films are one of metal films, insulating films or magnetic films.

21. The SPM cantilever according to claim 16, wherein said coating films are formed from one or the other of a monolayer film and a multilayer film or from a combination of monolayer film and multilayer film.

22. The SPM cantilever according to claim 21, wherein said coating films are one of metal films, insulating films or magnetic films.

23. The SPM cantilever according to claim 16, wherein said coating films are one of metal films, insulating films or magnetic films.

24. The SPM cantilever according to claim 4, wherein the coating films in the case of being applied to both of the side faces of said probe portion have different film thickness.

25. The SPM cantilever according to claim 24, wherein said coating films are formed from one or the other of a monolayer film and a multilayer film or from a combination of monolayer film and multilayer film.

26. The SPM cantilever according to claim 25, wherein said coating films are one of metal films, insulating films or magnetic films.

27. The SPM cantilever according to claim 24, wherein said coating films are one of metal films, insulating films or magnetic films.

* * * * *